J. B. BAKER
Cultivator.
No. 16,906.
Patented Mar. 31, 1857.
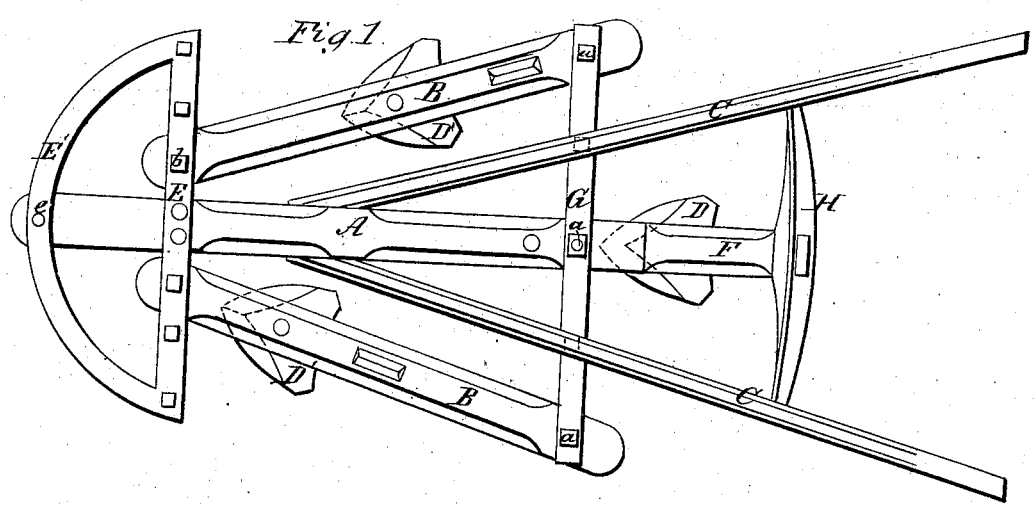
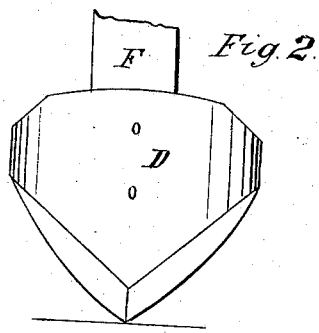
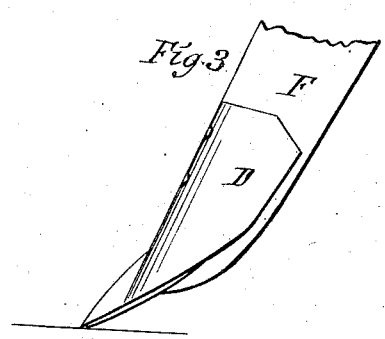

United States Patent Office.

JOHN B. BAKER, OF ONONDAGA, NEW YORK.

IMPROVEMENT IN CORN-CULTIVATORS.

Specification forming part of Letters Patent No. 16,906, dated March 31, 1857.

*To all whom it may concern:*

Be it known that I, JOHN B. BAKER, of Onondaga, county of Onondaga, in the State of New York, have invented a new and useful Improvement in Corn-Cultivators; and I do hereby declare that the following is a full and exact description thereof, reference being had to the accompanying drawing, and to the letters of reference marked thereon.

The nature of my invention consists in constructing the forward adjusting-bar with circular brace in front or arc, which serves the double purpose of brace to said bar and of fender to push the stalks aside without breaking them.

To enable others skilled in the art to make and use my invention, I will proceed to describe its construction and operation, reference being had to the accompanying drawing and the letters marked thereon, of which—

A represents the main horizontal or center beam; B B, the adjustable side beams, which are moved from or toward the center beam at either end on the adjusting-bars E and G, and secured to the latter by means of bolts $b\ b$ and $a\ a$.

D is the rear tooth, the beam or shank of which, F, passes by the back end of beam A, to which it is tenoned and braced, and is secured to the brace or connecting-rod H of the handles $c\ c$, which latter are secured at their lower ends to the main beam A.

D' D' are the two side or adjustable teeth, which are secured to the beams B B in the usual way.

E' is the circular brace or arc, attached to or formed with the bar E, and bolted to the main beam at $e$. The object of this circular brace or arc is, first, to prevent the adjusting-bar E from being bent or broken when the teeth meet with any obstacle, which disadvantage or accident is constantly experienced with the plain bars as now used; and, secondly, this arc serves as a fender for readily passing between the stalks and laying aside any which may be in the way without breaking them, as they would be without said fender or arc. It will be seen, then, that so constructing the adjusting-bar E as that it has an arc or fender, E', as described, gives it great advantage in point of durability over those now in existance, while with little or no extra weight or material the machine is supplied with a guard or fender which lays aside the stalks which may be in the way without injuring them.

I operate my cultivator in about the same manner as those now in use. When it is desired to change the distance between the teeth and their angle with the line of draft the beams B B are adjusted as required upon the bars E and G and secured in position by bolts $b\ b$ and $a\ a$.

I am aware that cultivators have been made with adjusting-bars before and behind, whereby the teeth may be adjusted in a manner similar to mine, and I do not therefor wish to be understood as making any claim to the adjustment; but, Having described the construction and operation of my machine, what I do claim as my invention, and desire to secure by Letters Patent, is—

The arc or fender E', in combination with the adjusting-bar E, whereby the stalks are laid aside, and the said bar rendered much more durable, the whole constructed as herein set forth.

In testimony whereof I have hereunto set my hand and seal this 21st day of February, 1857.

JOHN B. BAKER. [L. S.]

Witnesses:
J. N. MCINTIRE,
ARTHUR C. WATKINS.